(12) United States Patent
Okabe

(10) Patent No.: US 6,741,303 B1
(45) Date of Patent: May 25, 2004

(54) OPTICAL SHEET AND BACK LIGHT UNIT USING OPTICAL SHEET

(75) Inventor: Motohiko Okabe, Wakayama (JP)

(73) Assignee: Keiwa, Inc., Osaka (JP)

( * ) Notice: Subject to any disclaimer, the term of this patent is extended or adjusted under 35 U.S.C. 154(b) by 82 days.

(21) Appl. No.: 09/667,356

(22) Filed: Sep. 22, 2000

(30) Foreign Application Priority Data

Sep. 27, 1999 (JP) .............................................. 11-272591

(51) Int. Cl.[7] .............................................. G02F 1/1335
(52) U.S. Cl. .............................. 349/65; 349/62; 349/113
(58) Field of Search .............................. 349/62, 65, 113

(56) References Cited

U.S. PATENT DOCUMENTS 5,699,135 A    12/1997  Hisatake et al.
5,706,134 A  * 1/1998   Konno et al. ................ 359/599
6,151,169 A  * 11/2000  Kim .............................. 349/61
6,275,338 B1 * 8/2001   Arai et al. ..................... 349/65
6,417,831 B2 * 7/2002   Kashima ...................... 345/102
6,545,827 B1 * 4/2003   Okabe et al. ................ 359/837

FOREIGN PATENT DOCUMENTS

KR     1999-004687       1/1999

* cited by examiner

Primary Examiner—Robert H. Kim
Assistant Examiner—Jeanne Di Grazio
(74) Attorney, Agent, or Firm—Marshall, Gerstein & Borun LLP

(57) ABSTRACT

An optical sheet comprises a base layer made of transparent synthetic resins and having an optical characteristic, wherein the base layer is formed of different materials alternately arranged.

9 Claims, 3 Drawing Sheets

OPTICAL SHEET AND BACK LIGHT UNIT USING OPTICAL SHEET

BACKGROUND OF THE INVENTION

1. Field of the Invention

The present invention relates to an optical sheet suitable for a light diffusing sheet or the like built in a back light unit of a liquid crystal display, for example, and a back light unit using the optical sheet.

2. Description of the Related Art

For liquid crystal displays, a back light system in which a back surface of a liquid crystal layer is illuminated to thereby emit light has spread, and the back light unit is provided on a lower surface side of the liquid crystal layer. In general, as shown in FIG. 6, a back light unit 20 comprises a bar-shaped lamp 21 as a light source and a plurality of laminated optical sheets 22. Each of the optical sheets 22 has a particular optical characteristic such as refraction and diffusion. Specifically, these optical sheets 22 comprise a light guiding plate 23 whose ends are adapted to those of the lamp 21, a light diffusing sheet 24 provided on a front-surface side of the light guiding plate 23, and a prism sheet 25 provided on a front-surface side of the light diffusing sheet 24.

A function of the back light unit 20 will now be described. Light rays emitted from the lamp 21 enter the light guiding plate 23, are reflected by reflection dots or a reflection sheet (not shown) provided on a back surface of the light guiding plate 23 and side surfaces thereof, and emanate from a surface thereof. Then, the light rays emanating from the light guiding plate 23 enter the light diffusing sheet 24, are diffused therein, and emanate from a surface thereof. Then, the light rays emanating from the light diffusing sheet 24 enter the prism sheet 25, and emanate from prism portions 25a formed on a surface thereof as light rays exhibiting distribution having its peak in a substantially vertical direction. Thus, the light rays emitted from the lamp 21 are diffused by the light diffusing sheet 24 and refracted by the prism sheet 25 into the light rays having its peak in the substantially vertical direction, thereby illuminating the entire surface of the liquid crystal layer (not shown) provided above.

There is also a back light unit further provided with a light diffusing sheet or a prism sheet as the optical sheets 22 taking a light gathering characteristic of the prism sheet 25 into account, although this is not shown.

Since the light rays enter the light guiding plate 23 from its end side on which the lamp 21 is provided, the light rays cannot emanate from the light guiding plate 23 in the vertical direction thereof even if a reflection mechanism of the back surface thereof is devised, and a peak direction of the light rays emanating from the surface of the light guiding plate 23 is inclined at a predetermined angle toward an opposite side of the lamp 21. The direction of such inclination is determined depending on the type of the light guiding plate 23. Also, as for the prism sheet 25, the peak direction of the incident (incoming) light rays that is suitable for refracting the peak direction of the emanating light rays to vertical is determined by its shape.

Accordingly, it is desirable that the light diffusing sheet 24 be capable of guiding the predetermined peak direction of the light rays emanating from the light guiding plate 23 to the peak direction suitable for the incident light rays of the prism sheet 25.

By way of example, the conventional light diffusing sheet 24 is a light diffusing layer in which a light diffusing material such as resinous beads is dispersed on a surface thereof, or a light diffusing sheet having fine convex and concave regions on a surface thereof by embossing and the like. The main function of these light diffusing sheets 24 is to diffuse the penetrating light rays, and an angle changing ability to change the peak direction of the emanating light rays to vertical is added by the light diffusing ability. For this reason, in order to increase the angle changing ability of the conventional light diffusing sheet 24 to direct the penetrating light rays to a normal line direction, it is necessary to increase the light diffusing ability. In actuality, however, if the light diffusing ability is greatly increased, then the required amount of light rays emanating in the normal line direction is reduced and luminance of the liquid crystal display using the back light unit 20 is correspondingly reduced.

SUMMARY OF THE INVENTION

The present invention is directed to solving the above-described problem, and it is an object of the present invention to provide an optical sheet capable of directing a peak of passing light rays to vertical without increasing a light diffusing ability and a back light unit using the optical sheet.

In one aspect of the present invention, there is provided an optical sheet comprising a base layer made of transparent synthetic resins and having an optical characteristic, wherein the base layer is formed of different materials alternately arranged. With this optical sheet, it is possible to direct the light rays penetrating the base layer to a normal line direction by reflection or refraction at an interface between the different materials alternately arranged. Therefore, it is not necessary to increase the light diffusing ability to increase the angle changing ability unlike the conventional light diffusing sheet. Consequently, it is possible to increase the angle changing ability without reducing the amount of light rays emanating in the normal line direction.

Preferably, materials of different refractive indices are used as the different materials. The alternate arrangement of the materials of the different refractive indices effectively brings about reflection or refraction at the interface between the different materials alternately arranged.

When the materials of the different refractive indices are used as the different materials as described above, the refractive index may be continuously changed at the interface between the materials alternately arranged. Such changing of the refractive index at the interface between the different materials alternately arranged provides an effect in which each of the synthetic resins alternately arranged is a grated-type fiber that enables to curve, reflect, and refract the light ray in the vicinity of the interface. Consequently, it is possible to direct the emanating light rays toward the normal line direction.

Preferably, the interface between the different materials alternately arranged is perpendicular to the surface of the sheet. Thereby, the optical sheet can be easily fabricated, and the movement of the light rays passing according to the refractive indices of the different materials, namely, the angle changing ability can be easily predicted and designed. On the other hand, the interface between the different materials may be inclined in a predetermined direction with respect to the surface of the sheet. Thereby, the light rays passing the interface can be refracted upwardly.

Preferably, the different materials are arranged in stripes. The arrangement of the different materials in stripes to form the base layer provides the angle changing ability only in a stripe direction and in a vertical direction.

On the other hand, since the peak direction of the light rays emanating from the light guiding plate has the light outgoing characteristic in which the peak direction of the light ray emanating from the light guiding plate is inclined at a predetermined angle toward the opposite side of the lamp as mentioned previously, this can be adapted to the characteristic of the light emanating from the light guiding plate by the angle changing ability of the optical sheet only in the stripe direction and in the vertical direction by using this optical sheet, thereby directing the light rays to the normal line direction.

Preferably, the arrangement width of each of the different materials is larger than the wavelength of the visible light ray. Thereby, the above-described angle changing ability is effectively exhibited. Conversely, the arrangement width may be set to not larger than a wavelength of the visible light ray. In this case, the light rays passing the base layer are dispersed by diffraction. Therefore, the light diffusing ability can be greatly increased.

The optical sheet of the present invention is also applicable to a light diffusing sheet comprising a further light diffusing layer provided on a surface of the base layer. As the light diffusing layer, a binder in which resinous beads are dispersed may be used. In the optical sheet, the base layer has the angle changing ability and the light diffusing layer provided on the surface of the base layer has the light diffusing ability. For this reason, it is not necessary to increase the light diffusing ability for a larger angle changing ability unlike the conventional light diffusing sheet, and it is possible to add an angle changing ability as an ability separate from the light diffusing ability. Therefore, the amount of light emanating in the normal line direction is not reduced by the light diffusing ability if the angle changing ability is increased.

Preferably, the optical sheet of the present invention further comprises a sticking-proof layer provided on a rear surface of the base layer, in which resinous beads are dispersed in the binder. The provision of the sticking-proof layer on the rear surface of the base layer prevents sticking when the optical sheet is superimposed on another sheet.

Accordingly, with the use of the optical sheet of the present invention as the optical sheet in the back light unit for a liquid crystal display comprising a lamp and an optical sheet for uniformly guiding light rays emitted from the lamp to a front-surface side, the number of optical sheets required for directing the light rays to vertical can be reduced and the thinning of the back light unit is facilitated because of the higher angle changing ability described above. Besides, with the use of the optical sheet as the light diffusing sheet provided between the light guiding plate and the prism sheet, the optical sheet of the present invention has the angle changing ability that can be controlled relatively precisely and easily, and therefore can be adapted to the light outgoing characteristics of the light guiding plate and the prism sheet. Furthermore, it is not necessary to change the light diffusing ability for adjustment of the angle changing ability unlike the conventional light diffusing sheet, the luminance of the liquid crystal display can be improved without reducing the amount of light emanating in the normal line direction if the angle changing ability is increased.

This object, as well as other objects, features and advantages of the invention will become more apparent to those skilled in the art from the following description taken with reference to the accompanying drawings.

DETAILED DESCRIPTION OF THE PREFERRED EMBODIMENTS

Hereinafter, preferred embodiments of the present invention will be described with reference to FIGS. 1 through 5. FIGS. 1 through 5 are cross-sectional views showing optical sheets according to first to fifth embodiments of the present invention.

Figure 1:
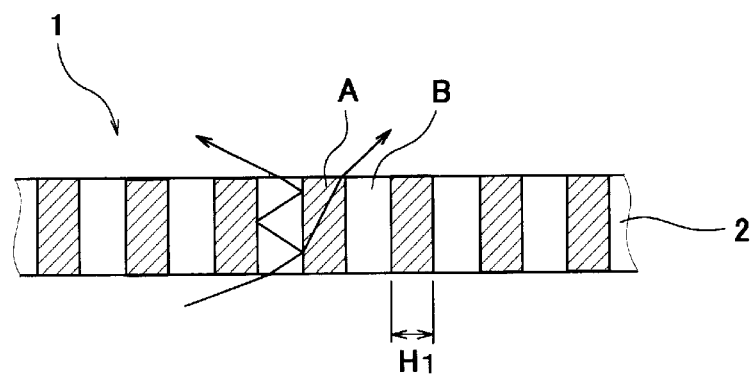
FIG. 1 is a cross-sectional view showing an optical sheet according to a first embodiment of the present invention.

Referring now to FIG. 1, an optical sheet 1 comprises only a base layer 2 made of transparent synthetic resins. The base layer 2 is formed in a sheet. In a plane of this sheet, a synthetic resin A and a synthetic resin B having different refractive indices are alternately arranged in stripes. Respective interfaces of the synthetic resins A and synthetic resins B are perpendicular to a sheet surface of the base layer 2 and parallel with each other.

Preferably, the difference of a refractive index between the synthetic resin A and the synthetic resin B is 0.001 to 1. This is because if the difference of the reflective index between the synthetic resin A and the synthetic resin B is smaller than 0.001, the amount of reflected light rays is smaller and a refractive effect is reduced, whereas if the difference is larger than 1, loss of light at the interfaces is increased.

A width H1 of each of the synthetic resins A and the synthetic resins B is larger than a wavelength of a visible light ray and is set to 0.7 $\mu$m to 3000 $\mu$m.

A thickness of the base layer 2 is not limited and is set to 50 $\mu$m to 250 $\mu$m, for example. This is because if the thickness of the base layer 2 is less than 50 $\mu$m, curling tends to occur on application of a resinous composition for forming the light diffusing layer when the light diffusing layer is formed on the base layer 2 as is described hereinafter or handling of the optical sheet becomes difficult, whereas if the thickness of the base layer 2 is larger than 250$\mu$m, the luminance of the liquid crystal display is reduced and the thickness of the back light unit is increased, which is contrary to requirements for a thinner liquid crystal display.

The materials of the synthetic resin A and the synthetic resin B used for the base layer 2 are not limited. For example, synthetic resins such as polyethylene terephthalate, polyethylene naphthalate, acrylic resin, polycarbonate, polystyrene, polyolefin, cellulose acetate, weather-resistant vinyl chloride, and the like are used.

According to the optical sheet 1 described above, the movement of a light ray passing from a lower surface side to an upper surface side thereof is controlled by the reflection and refraction at the interface between the synthetic resin A and the synthetic resin B as indicated by a solid line arrow of FIG. 1. For this reason, the emanating light rays include a light ray going in a reverse direction of the incident light ray, a light ray going in a forward direction of the incident light ray, and a light ray going in a normal line direction of the incident light ray, resulting from reflection and refraction, and the peak direction of the emanating light ray is refracted to the normal line direction as a result of the combination of these light rays.

Subsequently, a method for fabricating the optical sheet 1 will be described. Two extruders are respectively used to extrude the synthetic resin A and the synthetic resin B separately. A mixer placed before a die sequentially delivers the synthetic resin A and the synthetic resin B and injects them into the die so that the synthetic resins A and B are alternately arranged. Then, so arranged synthetic resins are extruded from the die in a sheet to thereby fabricate the optical sheet 1 in which the synthetic resins A and B are alternately arranged in the plane.

Figure 2:
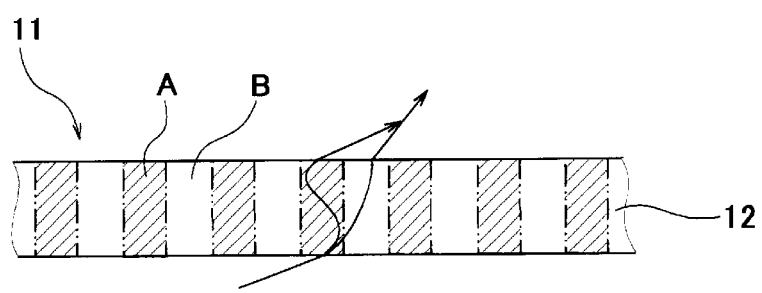
FIG. 2 is a cross-sectional view showing an optical sheet according to a second embodiment of the present invention.

Referring to FIG. 2, an optical sheet 11 is identical to the optical sheet 1 except for the state of an interface between the synthetic resins A and B. Although the synthetic resins A and B of the optical sheet 1 are separated from each other at the interface, the synthetic resins A and B of the optical sheet 11 are mixed at the interface between them and concentrations of compositions of the synthetic resins A and B are gradually increased and decreased at predetermined intervals. For this reason, at the interface between the synthetic resins A and B of the optical sheet 11, a refractive index continuously changes from the refractive index of the synthetic resin A to the refractive index of the synthetic resin B.

In the optical sheet 11, the movement of the light ray passing from the lower surface side to the upper surface side thereof is curved, reflected and refracted at the interface between the synthetic resins A and B as indicated by a solid line shown in FIG. 2. The curvature, reflection and refraction of the light rays make it possible to direct the peak directions of all the emanating light rays to the normal direction.

Figure 3:
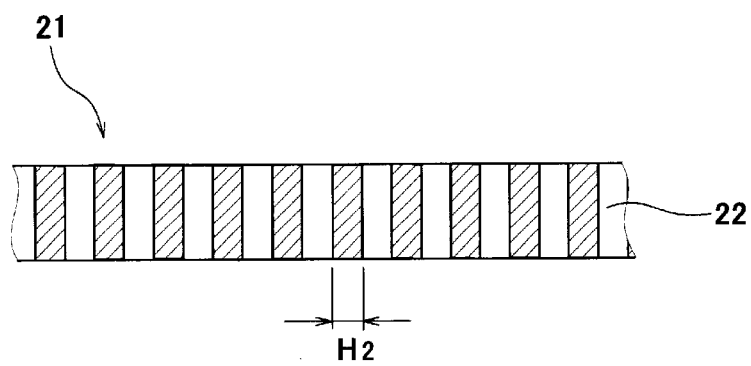
FIG. 3 is a cross-sectional view showing an optical sheet according to a third embodiment of the present invention.

Referring to FIG. 3, an optical sheet 21 is identical to the optical sheet 1 except for a width H2 of each of the synthetic resins A and B alternately arranged. The width H2 is not larger than the wavelength of the visible light ray and is specifically set to 0.01 $\mu$m to 0.7 $\mu$m. In the optical sheet 21, the light ray passing the base layer 2 is dispersed by diffraction. Consequently, the light diffusing ability of the optical sheet 21 is greatly increased.

Figure 4:
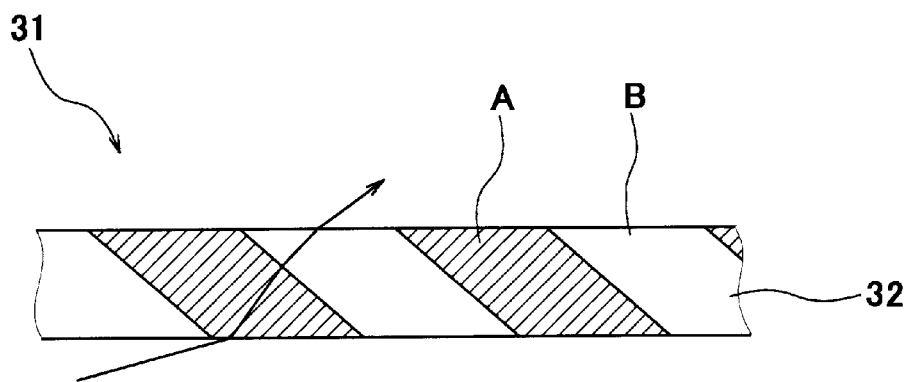
FIG. 4 is a cross-sectional view showing an optical sheet according to a fourth embodiment of the present invention.

Referring to FIG. 4, an optical sheet 31 is identical to the optical sheet 1 except for a direction of the interface between the synthetic resins A and B. The interfaces of the optical sheet 31 are inclined in a predetermined direction at a predetermined angle with respect to the sheet surface, unlike the interfaces of the optical sheet 1 that are perpendicular to the sheet surface.

As described above, the light guiding plate of the back light unit has the light outgoing (emanating) characteristic in which the peak direction of the emanating light ray is inclined. However, if the optical sheet 31 is placed in the back light unit in such a manner that the interfaces of the synthetic resins A and B of the optical sheet 31 are opposed to the incident light ray, then the light ray passing the interface between the inclined synthetic resins A and B is refracted upwardly. For this reason, the optical sheet 31 has an increased angle changing ability to direct the penetrating light ray to the normal line direction.

Figure 5:
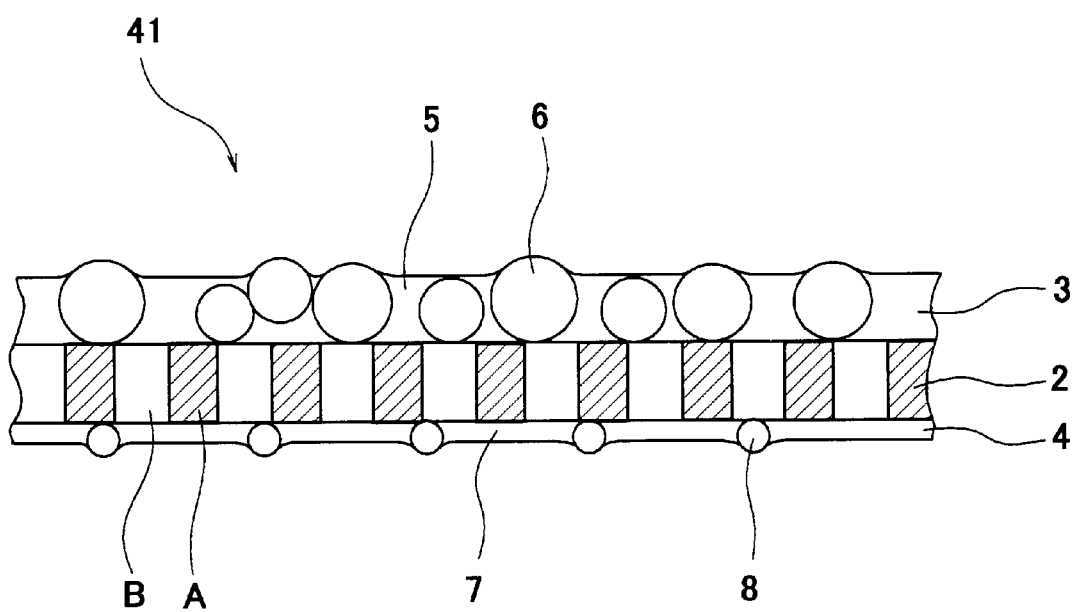
FIG. 5 is a cross-sectional view showing an optical sheet according to a fifth embodiment of the present invention.
Figure 6:
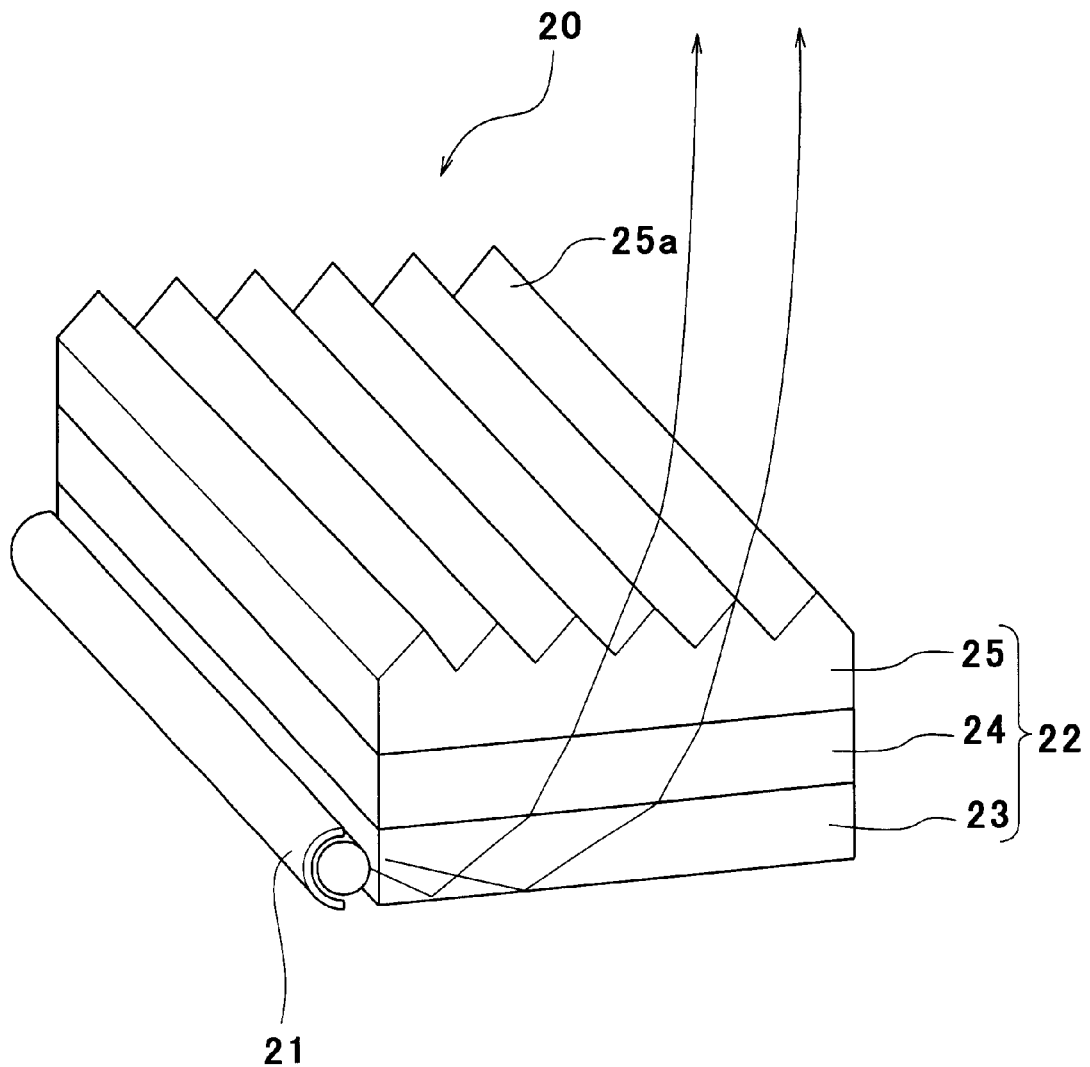
FIG. 6 is a perspective view showing a general back light unit.

Referring to FIG. 5, an optical sheet 41 comprises the base layer 2 like the optical sheet 1 of FIG. 1, and further comprises a light diffusing layer 3 provided on a front surface of the base layer 2 and a sticking-proof layer 4 provided on a rear surface of the base layer 2.

The light diffusing layer 3 is constituted by a binder 5 and resinous beads 6 dispersed in the binder 5. The dispersion of the resinous beads 6 in the light diffusing layer 3 enables to uniformly diffuse the light ray penetrating from a rear surface side thereof to a front surface side thereof. Some of the resinous beads 6 have upper end portions protruding from the binder 5. The resinous beads 6 thus comprise beads embedded in the binder 5 and beads having upper end portions protruding therefrom, thereby greatly diffusing the light ray.

As examples of a polymer used for the binder 5, there are acrylic-based resin, polyurethane, polyester, fluorine-based resin, silicone based resin, polyamide, epoxy resin, and the like. In addition to the above polymer, elasticizer, stabilizer, degradation inhibitor, dispersant, anti-static additive, and the like may be compounded into the binder 5. The binder 5 is transparent because it needs to transmit light rays and is preferably colorless and transparent.

The resinous beads 6 are substantially sphere-shaped. The materials of the resinous beads 6 are acrylic resin, polyurethane, polyvinyl chloride, polystyrene, polyacrylonitrile, polyamide, and the like. The resinous beads 6 are preferably transparent for a larger amount of the light ray penetrating the optical sheet 41 and are more preferably colorless and transparent.

The averaged particle diameter of the resinous bead 6 is preferably 1 $\mu$m to 50 $\mu$m and is more preferably 2 $\mu$m to 20 $\mu$m. If the averaged particle diameter is less than 1 $\mu$m, an unsatisfactory light diffusing ability is obtained, whereas if it is larger than 50 $\mu$m, the application of the resin composition forming the light diffusing layer 3 becomes difficult.

The amount of resinous beads 6 mixed in the light diffusing sheet 3 is preferably 1–500 parts by weight with respect to 100 parts by weight of the polymer in the binder 5 and is more preferably 5–300 parts by weight. If the amount of the mixed beads is less than the 1 part by weight, an unsatisfactory light diffusing ability is obtained, whereas if it is larger than the 500 parts, the application of the resin composition for forming the light diffusing layer 3 becomes difficult.

The sticking-proof layer 4 is constituted by a binder 7 and resinous beads 8 dispersed in the binder 7. The materials of the binder 7 and the resinous beads 8 are identical to those of the light diffusing layer 3. The amount of mixed resinous beads 8 is relatively small and therefore the resinous beads 8 are spaced apart from each other and dispersed in the binder 7. Most of the resinous beads 8 have their lower end portions protruding from the binder 7.

Therefore, when the optical sheet 41 is provided on the light guiding plate or the like, the lower end portions of the resinous beads 8 protruding from the rear surface thereof abut with the surface of the light guiding plate or the like, and therefore, the rear surface of the optical sheet 41 does not entirely abut with the light guiding plate or the like. Thereby, the sticking of the optical sheet 41 to the light guiding plate or the like is prevented and a luminance variation of a screen of a liquid crystal display is suppressed.

It should be noted that the optical sheet of the present invention is not limited to the embodiments described above. By way of example, instead of alternately arranging the synthetic resins A and B in the base layer 2 in stripes, the synthetic resins A and B may be alternately arranged in lattice in the sheet surface, that is, as having a checkered pattern. Moreover, the light diffusing layer 3 and the sticking-proof layer 4 may be provided on each of the base layers 12, 22, and 32 of the optical sheets shown in FIGS. 2–4. Also, only the light diffusing layer 3 may be provided on each of the base layers 12, 22, and 32.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. An optical sheet comprising:
    a base layer having a first portion formed of a first transparent synthetic resin and a second portion formed of a second transparent synthetic resin different from the first transparent synthetic resin, wherein the first portion and the second portion are alternately arranged parallel to a light source edge of said optical sheet; and
    a sticking-proof layer provided on a rear surface of the base layer, wherein the sticking-proof layer is formed by dispersing resinous beads in a binder, wherein the sticking-proof layer is capable of preventing sticking between the optical sheet and a light guiding plate.

2. The optical sheet according to claim 1, wherein the first portion and the second portion have different refractive indices.

3. The optical sheet according to claim 2, wherein a refractive index continuously changes at an interface between the first portion and the second portion alternately arranged.

4. An optical sheet comprising:
    a base layer having a first portion formed of a first transparent synthetic resin and a second portion formed of a second transparent synthetic resin different from the first transparent synthetic resin, wherein an interface between the first portion and the second portion is alternately arranged and is inclined with respect to a light source edge of said optical sheet; and
    a sticking-proof layer provided on a rear surface of the base layer, wherein the sticking-proof layer is formed by dispersing resinous beads in a binder, wherein the sticking-proof layer is capable of preventing sticking between the optical sheet and a light guiding plate.

5. The optical sheet according to claim 1, wherein the first portion and the second portion are arranged in stripes.

6. The optical sheet according to claim 1, wherein a width of each of the first portion and the second portion alternately arranged is larger than a wavelength of a visible light ray.

7. The optical sheet according to claim 1, wherein a width of each of the first portion and the second portion alternately arranged is not larger than a wavelength of a visible light ray.

8. The optical sheet according to claim 1, further comprising a light diffusing layer provided on a front surface of the base layer, wherein the light diffusing layer is formed by dispersing resinous beads in a binder.

9. A back light unit for a liquid crystal display comprising:
    a lamp; and
    an optical sheet including a base layer having a first portion formed of a first transparent synthetic resin and a second portion formed of a second transparent synthetic resin different from the first transparent synthetic resin, wherein the first portion and the second portion are alternately arranged parallel to a light source edge of said optical sheet for uniformly guiding light rays emitted from the lamp to a surface side thereof, the optical sheet further including a sticking-proof layer provided on a rear surface of the base layer, wherein the sticking-proof layer is formed by dispersing resinous beads in a binder, wherein the sticking-proof layer is capable of preventing sticking between the optical sheet and al light guiding plate.

* * * * *